Sept. 9, 1958        S. HENIG        2,851,235

CRADLE FOR A MISSILE

Filed July 14, 1953        2 Sheets-Sheet 1

INVENTOR
SEYMOUR HENIG

BY
ATTORNEYS

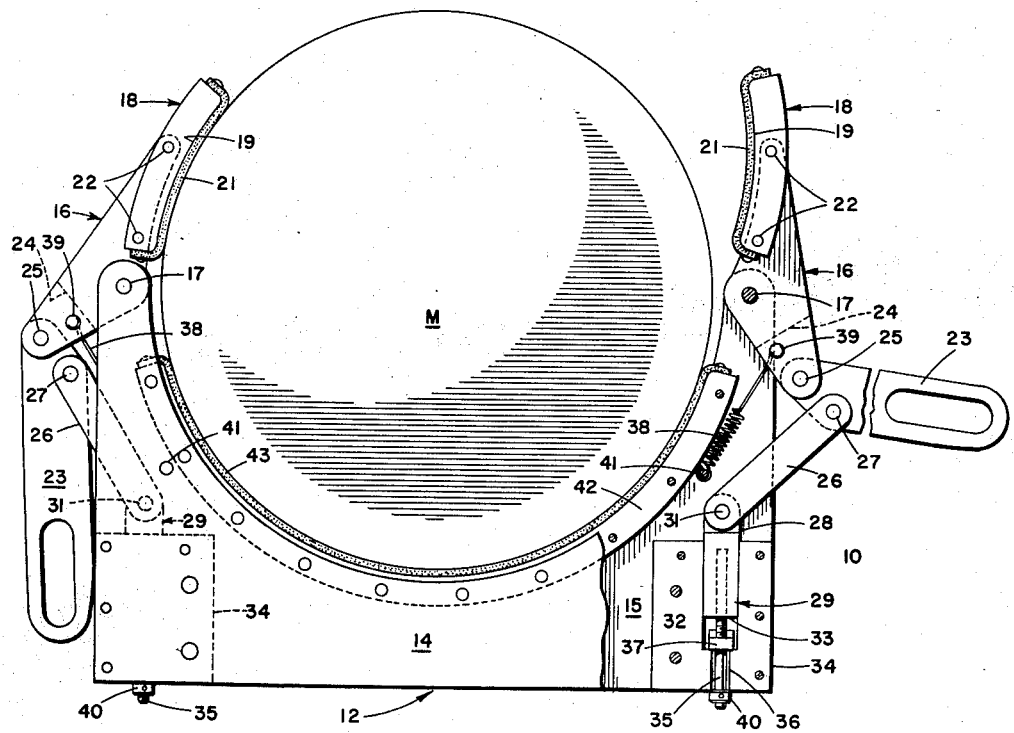

United States Patent Office 2,851,235
Patented Sept. 9, 1958

2,851,235

CRADLE FOR A MISSILE

Seymour Henig, New Alexandria, Va.

Application July 14, 1953, Serial No. 368,017

3 Claims. (Cl. 248—119)

(Granted under Title 35, U. S. Code (1952), sec. 266)

The invention described herein may be manufactured and used by or for the Government of the United States of America for governmental purposes without the payment of any royalties thereon or therefor.

The present invention relates to a device for transporting heavy loads and more particularly to a cradle including a clamping device for securing a missile to a wheeled dolly for transporting the missile from one location to another, and, in addition, a load adjusting device for shifting the load within the cradle from one position to another.

Heretofore, several types of devices have been employed for performing the function of retaining missile loads such as guided missiles, torpedoes or the like upon dollies for the purpose of facilitating the transportation of such missiles from one location to another. Screw down clamps have been used in some of these devices while in others cable lashings have been employed for the purpose of securing the missile to the transporting dolly.

The devices of the prior art have not been altogether satisfactory for the reason that such devices for securing a missile in place may result in damage to the thin shell of the missile even when extreme caution and low speeds during transport have been used. The need for a clamping device which will hold a missile without slippage or looseness while the missile is being transported from a storage point to a subsequent location has been emphasized by the growing complexity of modern missiles as well as the sensitivity or explosive nature of the various components employed therein. Consequently, missiles of the present day types must be transported and handled without even slight damage thereto if malfunctions are to be avoided. At the same time, however, missiles must be handled efficiently and with rapidity and the handling personnel must not be placed at a disadvantage in performing their duty of efficient handling by being required to exercise extreme caution while handling the missiles or to transport the same at extremely low speeds.

With the foregoing in mind it is an object of this invention to provide a combination cradle and clamping device for a transporting vehicle or dolly whereby the missile may be secured to the cradle in a positive manner eliminating all possibility of slippage or looseness.

Another object of the present invention resides in the provision of a cradle-clamp which will hold a missile without the employment of additional clamps or securing means.

A further object is the provision of a cradle-clamp device which will not damage the surface of the missile.

Another object is to provide a clamping device which can be actuated to secure a missile upon a transporting dolly with rapidity and positiveness.

Still another object is the provision of a cradle-clamp device which employs structure for increasing the effectiveness of a shock absorbing system of the transporting dolly upon which the cradle may be mounted.

Yet another object resides in the provision of structure whereby the center of gravity of the missile may be quickly ascertained after the missile has been placed within the cradle.

A still further object is to provide means for shifting the missile within the cradle before the clamping members are set in a clamping position.

An additional object of the instant invention resides in the provision of a cradle clamp which may be economically manufactured and is rugged in design and performance.

Other objects and many of the attendant advantages of this invention will be readily appreciated as the same becomes better understood by reference to the following detailed description when considered in connection with the accompanying drawings wherein.

Fig. 3 is an enlarged end elevation of the present invention showing one of the clamping members in a locked position and another clamping member in an unlocked position; and Fig. 4 is an enlarged side perspective view of one form of load adjusting means which forms a portion of the present invention and indicates the manner in which the missile may be shifted within the cradle before the clamping members are locked.

Figure 1:
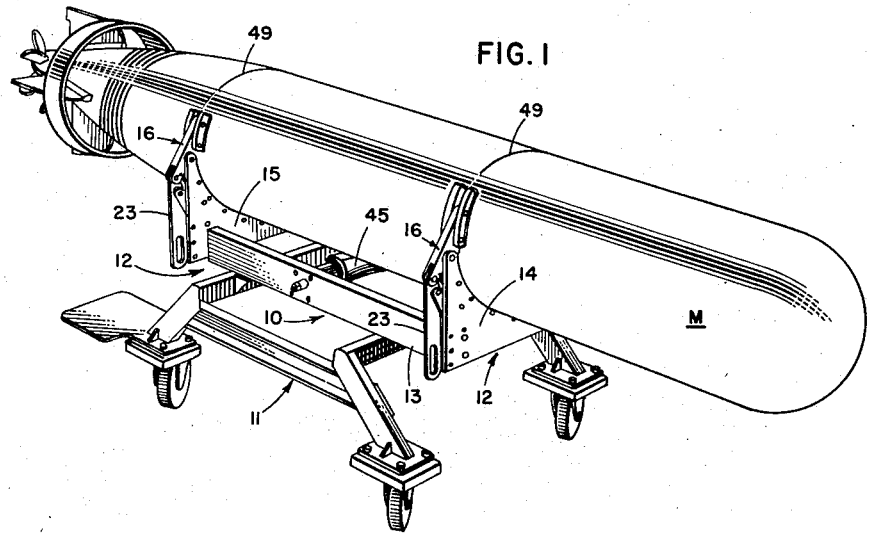
Fig. 1 is a three-quarter perspective view of the present invention illustrating the manner in which a missile may be secured thereto and carried by an associated wheeled vehicle such, for example, as a dolly.

Referring now to the several figures of the drawings and more particularly to Fig. 1 thereof it will be observed that the cradle of the present invention, generally designated by reference numeral 10, may be secured in any manner found suitable for the purpose such, for example, as by welding to a supporting structure which may be a wheeled dolly 11 if desired. As is best illustrated in Fig. 1, the cradle 10 is particularly suitable to support a cylindrical load such as a torpedo M within the cradle while, at the same time, preventing the load from shifting in any direction relative to the cradle.

Figure 2:
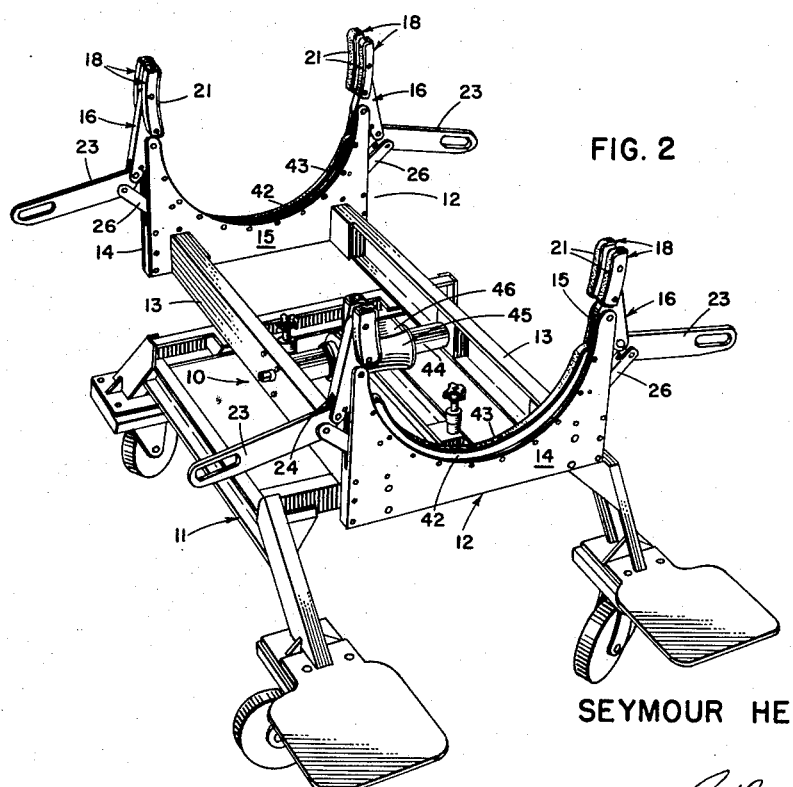
Fig. 2 is a perspective view from above the cradle clamp of the present invention with the clamping shoes in the unlocked position.

Reference is now made to Figs. 2, 3, and 4, and most particularly to Fig. 3, wherein is disclosed the structural details of the present invention. The cradle comprises a pair of vertically disposed U-shaped structures, generally indicated at 12 spaced from and interconnected with one another by longitudinal members 13 which may be of channel construction if desired. Each of the upstanding supports 12 may be fabricated from a pair of parallel, substantially U-shaped, spaced plates 14 and 15, spaced from one another for the accommodation of the several linkage members comprising the clamping device.

The upper end of each side of each vertical, U-shaped support 12 of cradle 10 is provided with a toggle clamp which is independently capable of securing a cylindrical load within the cradle 10, as will become more readily apparent as the description proceeds. A bell crank 16 is pivotally connected at the knee thereof to the upper end of each side of each vertical support 12 as by pin 17, for example. On each side of the upper end of bell crank 16 is provided a shoe 18 having an arcuate inner surface 19 upon which may be secured a strip of resilient material 21 which has a high coefficient of friction. The shoes 18 are connected to bell crank 16 by stud bolts 22. A clamp handle 23 is received within slot 24 at the other or lower end of bell crank 16 and pivotally secured within the slot by pin 25. A toggle link 26 is pivotally secured by pin 27 at the upper end thereof to the upper end of clamp handle 23 adjacent the pivotal connection between bell crank 16 and handle 23. The other end of toggle link 26 is bifurcated to embrace a tongue 28 at the upper end of an adjusting member 29, toggle link 26 being connected to adjusting member 29 by pin 31 for pivotal movement. It will be apparent that by such arrangement a toggle action is provided when handle 23 is lowered to retain the clamping shoes 18 in a closed position.

Adjusting member 29 is provided with an internally threaded longitudinal bore 32 extending partially through the adjusting member and a shoulder 33 adjacent the lower end of the adjusting member opposite pin 31. Adjusting member 29, is slidably mounted within a suitable housing 34 which, in turn, is rigidly mounted to and between plates 14 and 15 of the cradle supports 12. A threaded adjusting bolt 35 is passed through bore 36 provided within the housing 34 and is threadedly engaged with the internal threads of bore 32 within the adjusting member. It will be apparent that the adjusting member 29 may be moved upwardly or downwardly upon rotation of adjusting bolt 35. A thrust bearing 37 which is integral with bolt 35 may be provided for preventing longitudinal movement of the bolt. A knob 40 is pin connected to bolt 35 for rotating the latter.

Such movement of adjusting member 29 alters the relationship of the various links of the clamping device to thereby enable the latter to clamp the load securely when clamp handle 23 and toggle link 26 are moved beyond dead center.

A coil spring 38 is connected between pin 39 on bell crank 16 adjacent the lower end thereof and pin 41 on each cradle support 12 so as to retain the clamping shoes in an open position by reason of the tension of the spring when handle 23 is in its raised position.

It will be observed that each cradle support 12 is provided with a shoe 42 which is arcuate in configuration and is rigidly secured between plates 14 and 15 of each cradle support. The inner surface of each shoe 42 is provided with a pad 43 which may be of any suitable resilient material having a high coefficient of friction. The lower shoes 42 and their associated friction pads 43 together with shoes 18 and their associated pads 21 enclose the circumferential contour of the load for sufficiently more than 180° so that a cylindrical load may be securely clamped within the cradle supports by the movement of only one clamp handle 23 to a locked or vertical position.

A shaft 44, best illustrated in Fig. 4, is rotatably mounted between the longitudinally extending side members 13 of the cradle clamp. Shaft 44 is provided with an enlarged central portion or roller 45 which may be composed of any suitable material having the desired coefficient of friction such, for example, as leather. It will be observed that roller 45 is so formed as to engage with a substantial portion of the circumference of a missile such as torpedo M when the roller is in most positions. However, roller 45 is so shaped as to have a flattened surface 46 extending the entire length of the roller thereby providing a small amount of clearance from the undersurface of the missile when the latter rests within the cradle. When roller 45 is rotated by any suitable means such as by the rotation of wrench 47 which may be engaged with a reduced hexagonal head 48 at the end of rotatably mounted shaft 44, the missile is lifted off one of the cradle supports 12 and longitudinally shifted with respect to the cradle and the roller axis. It is customary to complete assembly of certain missiles after the components thereof have been placed in the cradle, and roller 45 facilitates such assembly operations because the missile can be shifted so as to provide access to joint rings such, for example, as those indicated at 49 in Fig. 1 with which the missile may be provided and portions of which may underlie the clamping members 18 when the missile has been secured within the cradle.

In addition, roller 45 provides a means by which the center of gravity may be readily ascertained by observing the instability of the missile at the point of balance on the roller. Without roller 45, the foregoing operations necessitated the use of a large crane with special shackles or slings in addition to the expenditure of a considerable amount of time and effort. When it is desired to reposition roller 45 with the flattened side thereof adjacent the missile, transversely opposite clamps at one end of the cradle may be closed and roller 45 may then be rotated to bring the flattened side thereof into the desired position without moving the missile.

Obviously many modifications and variations of the present invention are possible in the light of the above teachings. It is therefore to be understood that within the scope of the appended claims the invention may be practiced otherwise than as specifically described.

What is claimed is:

1. A cradle for securing a load to a transporting vehicle comprising, in combination, a plurality of substantially U-shaped, vertically disposed supporting members, said supporting members being longitudinally spaced relative to one another along the length of the transporting vehicle, an upwardly facing, arcuate padded shoe secured to the lower portion of each of said supporting members for engagement with a load placed thereupon, a toggle clamp including a bell crank pivotally connected to the upper end of each arm of each of said supporting members, arcuate clamping means on said bell crank, said bell crank being pivotally connected at the knee thereof to the upper end of each arm of said supporting members, a clamp handle pivotally carried by the lower end of the bell crank, a toggle link pivotally connected at one end thereof to the clamp handle, and adjustable means for pivotally and adjustably connecting the other end of said toggle link to said supporting members, said adjustable means including a housing secured to each of said supporting members and having a bore provided therein, an adjusting member slidably mounted within the bore in said housing and having an internally threaded bore, said housing having a bore in register with the bore within said adjusting member, and an externally threaded stud threaded into the threaded bore for causing said adjusting member to be moved slidably in a vertical direction in accordance with the rotation of said threaded stud thereby to control the clamping action of said clamping means.

2. A cradle for securing a load to a transporting vehicle comprising, in combination, a plurality of load receiving members longitudinally spaced relative to one another, a plurality of load clamping means pivotally connected to each of said load receiving members, each clamping means together with said load receiving means defining a load engaging surface having a greater circumferential length than one-half the circumferential length of the load, said load clamping means including a bell crank pivotally connected at the knee thereof to each of said load receiving members, a padded clamping shoe connected to the upper end of said bell crank, a clamp handle pivotally carried by the lower end of the bell crank, a toggle link pivotally connected at one end thereof to the clamp handle, a housing secured to each of said load receiving members, an adjusting member slidably carried within said housing and having an internally threaded bore, means for pivotally connecting the other end of said toggle link to said adjustable member, said housing having a bore in registration with the threaded bore within said adjusting member, an externally threaded stud having one end rotatably mounted within said bore in the housing and the other end thereof threaded into said threaded bore for moving said adjustable member in a vertical direction in response to the rotation of said stud thereby to change the relationship between said clamping shoe and the load so as to increase and decrease the clamping action of the shoe against the load, and means secured to said stud in engagement with said housing for maintaining said one end of the stud within the bore in the housing.

3. A device for supporting, clamping, and positioning a cylindrical ordnance missile on the device in a predetermined position comprising a pair of arcuately shaped mutually spaced supporting members for engagement with the missile and for supporting the missile while the latter is in a state of rest, a pair of oppositely disposed clamping members pivotally connected to each of said supporting members for engaging and clamping the missile in a predetermined position with respect to said supporting members when the missile is moved from an initial position to said predetermined position, means including an eccentric roller rotatably supported on said device between said supporting members for moving the missile longitudinally and vertically along and between said supporting members, means on said supporting members for guiding said missile during said longitudinal movement when said clamping members are disengaged from the missile and for guiding the missile during said movement thereof when at least one pair of clamping members is in clamping engagement with the missile, adjustable means slidably mounted on said supporting members and operatively connected to said clamping members, and rotatable means mounted on said supporting members in threaded engagement with said adjustable means for moving said adjustable means slidably on the supporting members in response to rotation of said rotatable means thereby to control the clamping action of the clamping members.

References Cited in the file of this patent

UNITED STATES PATENTS

| | | |
|---|---|---|
| 2,161,734 | Wheless | June 6, 1939 |
| 2,298,851 | Wachter | Oct. 13, 1942 |
| 2,360,133 | Houssiere | Oct. 10, 1944 |
| 2,698,597 | Buck | Jan. 5, 1955 |

FOREIGN PATENTS

| | | |
|---|---|---|
| 475,232 | Great Britain | Nov. 16, 1937 |
| 501,302 | Great Britain | Feb. 24, 1939 |
| 544,077 | Great Britain | Mar. 26, 1942 |
| 578,688 | Great Britain | July 8, 1946 |